US 6,670,907 B2

(12) United States Patent
Cho

(10) Patent No.: US 6,670,907 B2
(45) Date of Patent: Dec. 30, 2003

(54) EFFICIENT PHASE CORRECTION SCHEME FOR RANGE MIGRATION ALGORITHM

(75) Inventor: Kwang M. Cho, Rancho Palos Verdes, CA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 10/060,647

(22) Filed: Jan. 30, 2002

(65) Prior Publication Data

US 2003/0142000 A1 Jul. 31, 2003

(51) Int. Cl.$^7$ .............................................. G01S 13/00
(52) U.S. Cl. ......................................... 342/25; 342/196
(58) Field of Search ......................... 342/25, 192, 195, 342/196

(56) References Cited

U.S. PATENT DOCUMENTS

| H741 H | * | 2/1990 | Powell et al. ................ 342/25 |
| 4,924,229 A | * | 5/1990 | Eichel et al. ................ 342/25 |
| 5,248,976 A | * | 9/1993 | Niho et al. .................. 342/25 |
| 5,659,318 A | * | 8/1997 | Madsen et al. ............... 342/25 |
| 5,898,399 A | * | 4/1999 | Carrara et al. ............... 342/25 |
| 6,018,306 A | * | 1/2000 | Serbin ........................ 342/25 |
| 6,492,932 B1 | * | 12/2002 | Jin et al. .................... 342/25 |

FOREIGN PATENT DOCUMENTS

EP          0544280 A1  *  6/1993  ........... G01S/13/90

OTHER PUBLICATIONS

"3–D radar imaging using range migration techniques," Lopez–Sahcnez, J.M.; Fortuny–Guasch, J.; Antennas and Propagation, IEEE Transactions on, vol.: 48 Issue: 5, May 2000. Page(s):728–737.*

* cited by examiner

Primary Examiner—Thomas H. Tarcza
Assistant Examiner—Brian Andrea
(74) Attorney, Agent, or Firm—Leonard A. Alkov; Glenn H. Lenzen, Jr.

(57) ABSTRACT

A system and method for efficient phase error correction in range migration algorithm (RMA) for synthetic aperture radar (SAR) systems implemented by making proper shifts for each position dependent phase history so that phase correction can readily be performed using the aligned phase history data during batch processing. In its simplest form, the invention (44) is comprised of two main parts. First (60), alignment of the phase error profile is achieved by proper phase adjustment in the spatial (or image) domain using a quadratic phase function. Second (62), the common phase error can be corrected using autofocus algorithms. Two alternative embodiments of the invention are described. The first embodiment (44a) adds padded zeros to the range compressed data in order to avoid the wrap around effect introduced by the FFT (Fast Fourier Transform). This embodiment requires a third step (64): the target dependent signal support needs to be shifted back to the initial position after phase correction. The second embodiment (44b) uses the range compressed data without padded zeros. Instead, an aperture of greater length needs to be generated by the Stolt interpolation. In this embodiment, the third step (64) of shifting the signal support back can be eliminated.

13 Claims, 8 Drawing Sheets

EFFICIENT PHASE CORRECTION SCHEME FOR RANGE MIGRATION ALGORITHM

BACKGROUND OF THE INVENTION

1. Field of the Invention

The present invention relates to radar signal processing systems. More specifically, the present invention relates to phase error correction in range migration algorithm (RMA) for synthetic aperture radar (SAR) systems.

2. Description of the Related Art

In imaging applications such as ground mapping, a radar system is used to generate a two-dimensional image of a portion of a ground surface in the range and azimuth (cross-range) directions. A large antenna aperture is required in conventional imaging radar systems in order to achieve a narrow beamwidth and, consequently, fine azimuth resolution. Synthetic aperture radar (SAR) systems have been developed as an alternative means for improving azimuth resolution by synthesizing pulse-to-pulse return signals collected by a moving platform with a small antenna. The signal synthesis from many successive locations of the moving platform accomplishes what would otherwise require a larger antenna aperture.

Polar format algorithm (PFA) has been widely used for high-resolution SAR systems. However, PFA has the shortcomings of limited depth of focus and geometric distortion that increases with the map size. Range migration algorithm (RMA) is one of the most attractive and advanced SAR processing techniques to avoid the problems with the PFA. A difficulty with the RMA, however, is performing efficient phase correction.

Normal SAR data collection requires phase coherence, not only within each pulse for range resolution, but also from pulse to pulse over the collection time needed for azimuth resolution. The platform position affects the pulse-to-pulse phase coherence over the synthetic aperture. Phase error introduced by the inaccuracy of navigation data or undesirable platform motion causes smearing or duplication of the target image. Since motion compensation at the early processing stage based on the navigation data is not sufficient for producing a focused image, it is a common practice to employ data driven autofocus algorithms in high resolution SAR systems in order to maintain phase coherence and achieve good image quality.

Considering the computational efficiency and simplicity, it is desirable to implement the autofocus function after range compression during batch processing as is usually done for the case of PFA. However, for the case of RMA, it is difficult to implement the autofocus function during batch processing because the signal support areas from different targets are not aligned. For this reason, the autofocus function had to be implemented before batch processing starts, at the cost of increased complexity and processing time.

Because of the difficulty in implementing the autofocus function during batch processing, current RMA systems perform the autofocus function during the pulse-to-pulse processing phase using a separate polar format processing algorithm. This approach, however, has the disadvantage of implementation complexity and tighter processing timeline requirements. Furthermore, the increased timeline requirement makes it more difficult, if not impossible, to implement more advanced autofocus techniques.

Hence, a need exists in the art for an improved system or method for efficient phase error correction in range migration algorithm.

SUMMARY OF THE INVENTION

The need in the art is addressed by the present invention, a system and method for efficient phase error correction in RMA implemented by making proper shifts for each position dependent phase history so that phase correction can readily be performed using the aligned phase history data during batch processing. In its simplest form, the invention is comprised of two main parts. First, alignment of the phase error profile is achieved by proper phase adjustment in the spatial (or image) domain using a quadratic phase function. Then, the common phase error can be corrected using autofocus algorithms.

Two alternative embodiments of the invention are described. The first embodiment adds padded zeros to the range compressed data in order to avoid the wrap around effect introduced by the FFT (Fast Fourier Transform). This embodiment requires a third step: the target dependent signal support needs to be shifted back to the initial position after phase correction. The second embodiment uses the range compressed data without padded zeros. Instead, an aperture of greater length needs to be generated by the Stolt interpolation. In this embodiment, the third step of shifting the signal support back can be eliminated.

BRIEF DESCRIPTION OF THE DRAWINGS

FIG. 1b is an illustration showing the corresponding signal support areas in the spatial frequency domain of the two targets in FIG. 1a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 2:
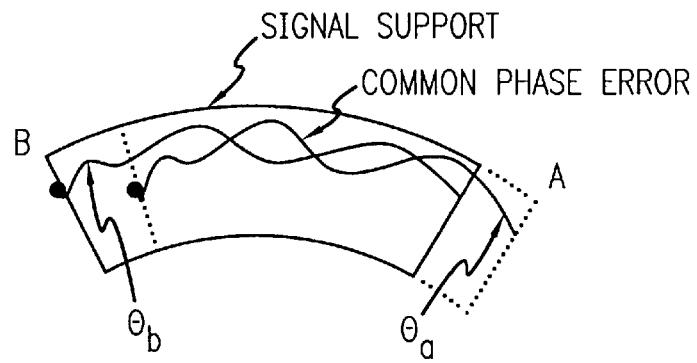
FIG. 2 is an illustration showing shifted signal support areas with common phase error.
Figure 3:
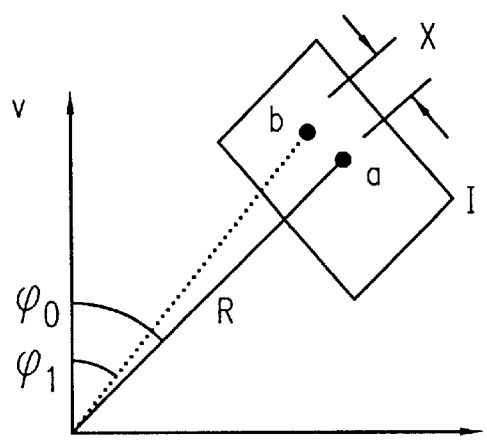
FIG. 3 is an illustration showing two targets in the target image separated in azimuth in the spatial domain.

Considering the computational efficiency and simplicity, it is desirable to perform phase correction in synthetic aperture radar (SAR) systems during batch processing. It is difficult to implement autofocus techniques during batch processing in range migration algorithm (RMA) because the signal support areas in the spatial frequency domain from different targets are not aligned. FIGS. 1–3 help illustrate this problem.

Figure 1A:
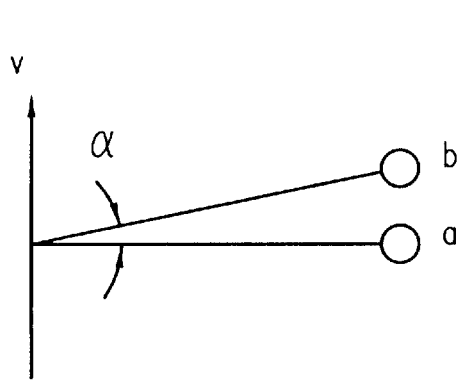
FIG. 1a is an illustration showing two targets at different azimuth locations in the spatial domain.
Figure 1B:
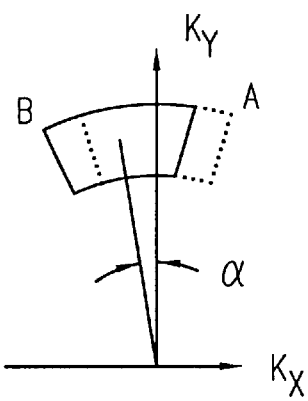

FIG. 1*a* is an illustration showing two targets, a and b, in the spatial (or image) domain at different azimuth locations, separated by an angle α. FIG. 1*b* is an illustration showing the corresponding signal support areas, A and B, in the spatial frequency domain of the two targets, a and b, respectively, shown in FIG. 1*a*. The signal support areas A and B do not occupy the same area. They are shifted, or more exactly, rotated, by the angle α. Thus, the signal support in the spatial frequency domain is shifted depending on the target's azimuth location.

FIG. 2 is an illustration showing shifted signal support areas A and B with corresponding phase history (or phase variation) $\theta_a$ and $\theta_b$, respectively. Phase error due to uncompensated platform motion induces the same effect to phase history for all targets. The phase histories $\theta_a$ and $\theta_b$ are identical except they are shifted by the angle α. The common phase error follows the rotated signal support for a displaced target in azimuth. (Since the angle span of signal support is small in most practical SAR systems, rotation can be approximated to be a linear shift in the azimuth direction.)

The position dependent shifting of the signal support in the spatial frequency domain makes it difficult to implement autofocus algorithms during batch processing for the RMA. In the case of polar format algorithm (PFA), the signal support areas of all targets are identical and therefore common phase error for all targets can readily be estimated and removed.

Misalignment of phase error in the spatial frequency domain is due to shifting of the signal support that is determined by the relative Doppler cone angle of each target. Since the amount of shifting can be calculated for a given target location in the azimuth direction, alignment of the phase error profile can be achieved by proper phase adjustment in the spatial domain. Once the phase error profiles are aligned, then the common phase error can be corrected using autofocus techniques.

FIG. 3 is an illustration showing two targets, a and b, in the target image I separated in azimuth in the spatial domain. The image I is oriented in the range and azimuth directions. The image center is located a distance R from the platform (located at the origin). Targets a and b are separated by a distance X in the azimuth direction. Target a has a Doppler cone angle $\Phi_0$ measured from the along track-direction v (the direction of platform motion). Target b has a Doppler cone angle $\Phi_1$ measured from the along track-direction v.

The azimuth variable in the spatial frequency domain, $K_{X,AT}$ in the along-track direction is expressed as:

$$K_{X,AT} = -\frac{2}{\lambda}\cos\varphi \quad [1]$$

where λ is the wavelength of the transmitted radar signal and Φ is the Doppler cone angle that is measured from the along-track direction.

The variation in $K_{X,AT}$ between targets a and b is therefore given by:

$$\Delta K_{X,AT} = -\frac{2}{\lambda}(\cos\varphi_1 - \cos\varphi_0) \quad [2]$$

$$= \frac{4}{\lambda}\sin\left(\frac{\varphi_0+\varphi_1}{2}\right)\sin\left(\frac{\varphi_0-\varphi_1}{2}\right) \quad [3]$$

$$\cong -\frac{2X}{R\lambda}\sin\varphi_0 \quad [4]$$

for X<<R and $\Phi_1 \approx \Phi_0$.

Since the image is oriented in the range and azimuth directions, then $K_x$ and $K_y$ should be oriented in the same manner and $\Delta K_X$ is expressed as:

$$\Delta K_X = \frac{\Delta K_{X,AT}}{\sin\varphi_0} = -\frac{2X}{R\lambda} \quad [5]$$

The derived expression for shifting in $K_x$ can be used for aligning the shifted signal support from multiple targets that are separated in azimuth. Required shifting in $K_x$ to align common phase error history can readily be accomplished by adjusting the phase in the spatial domain by:

$$\Delta\theta = 2\pi \cdot \Delta K_K X/2 = -2\pi \cdot \frac{X^2}{R\lambda} \quad [6]$$

The dividing factor 2 is for the desired group delay $\Delta K_X$ when $\Delta\theta$ is differentiated in X.

The present invention provides a system and method for efficient phase error correction in RMA by making proper shifts for each position dependent phase history so that phase correction can readily be performed using the aligned phase history data during batch processing. Alignment of the phase error profile is achieved by proper phase adjustment in the spatial domain using a quadratic phase function. Then, the common phase error can be corrected using autofocus algorithms.

Figure 4:
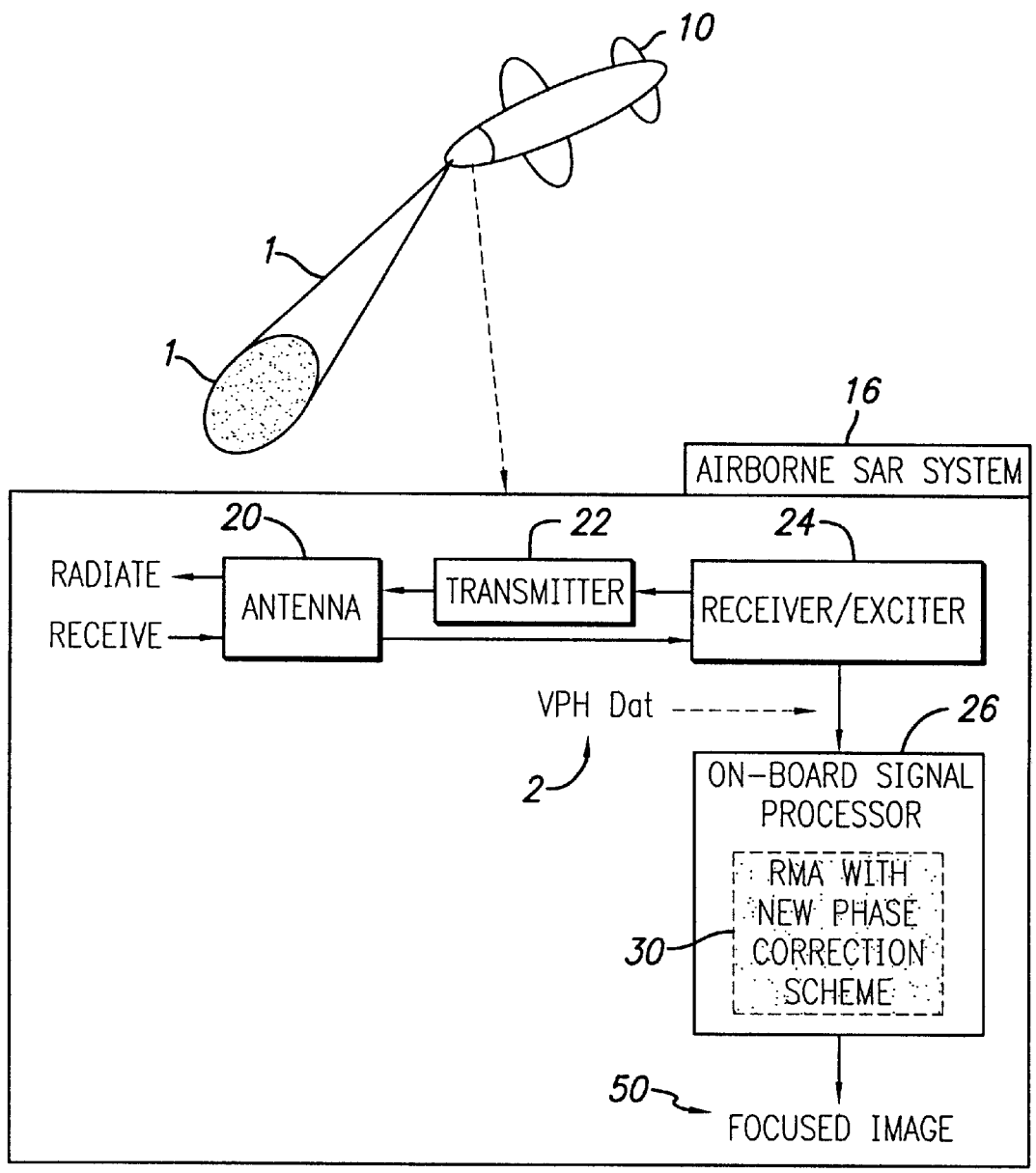
FIG. 4 is a simplified block diagram of an airborne SAR system using RMA with the new phase correction scheme in accordance with the teachings of the present invention.

FIG. 4 is a simplified block diagram of an airborne SAR system using RMA with the new phase correction scheme in accordance with the teachings of the present invention. A SAR system 16 mounted on an aircraft 10 generates an electromagnetic wave 12 which is reflected off a ground surface 14 and received by the SAR system 16. The SAR system 16 includes an antenna 20, a transmitter 22, and a receiver 24 for radiating and receiving the electromagnetic waves. The receiver 24 forms input video phase history (VPH) data 28 from the received data and sends it to an on-board signal processor 26. Residing in the signal processor 26 is a range migration algorithm 30 with the new phase correction scheme of the present teachings which outputs a focused image 50.

Figure 5:
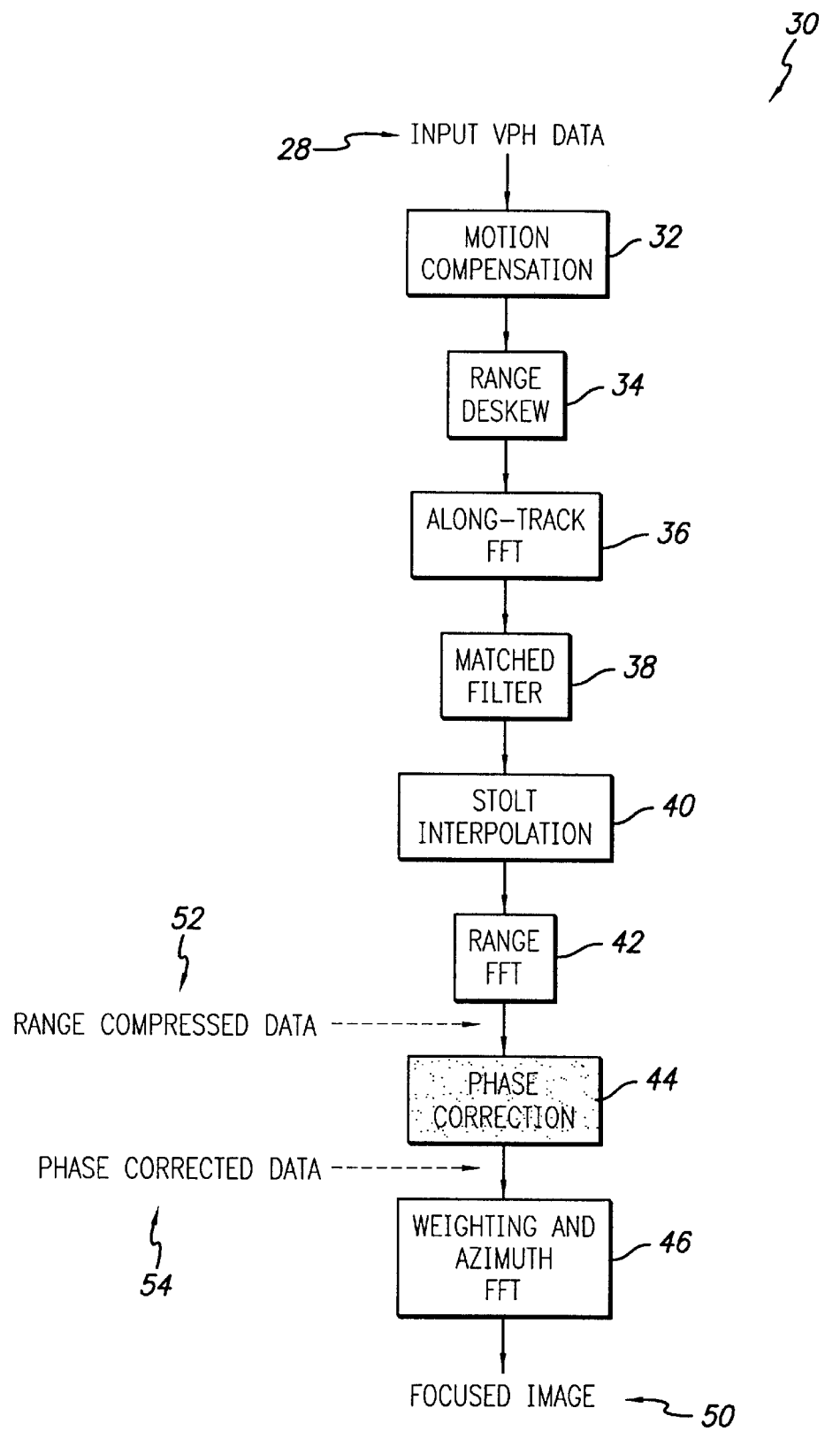
FIG. 5 is a simplified block diagram showing the functions in RMA with the new phase correction scheme in accordance with the teachings of the present invention.

FIG. 5 is a simplified block diagram showing the basic components of RMA and where the new phase correction scheme should be inserted in accordance with the teachings of the present invention. The basic components of RMA are well known in the art. The input VPH data 28 is successively passed through a Motion Compensation function 32, a Range Deskew function 34, an Along-Track FFT 26, a Matched Filter 38, a Stolt Interpolation 40, and a Range FFT 42. The new phase correction scheme 44 is inserted after the Range FFT 42, such that the input to the Phase Correction unit 44 is range compressed data 52. The phase corrected data 54 output from the Phase Correction unit 44 can then be weighted and passed through an Azimuth FFT 46 to generate a final focused image 50.

Two alternative embodiments of the present invention are described. The first embodiment adds padded zeros to the range compressed data in order to avoid the wrap around effect introduced by the FFT (Fast Fourier Transform). In this embodiment, the target dependent signal support is shifted back to the initial position after phase correction. The second embodiment uses the range compressed data without padded zeros. Instead, an aperture of greater length needs to be generated by the Stolt interpolation.

Figure 6A:
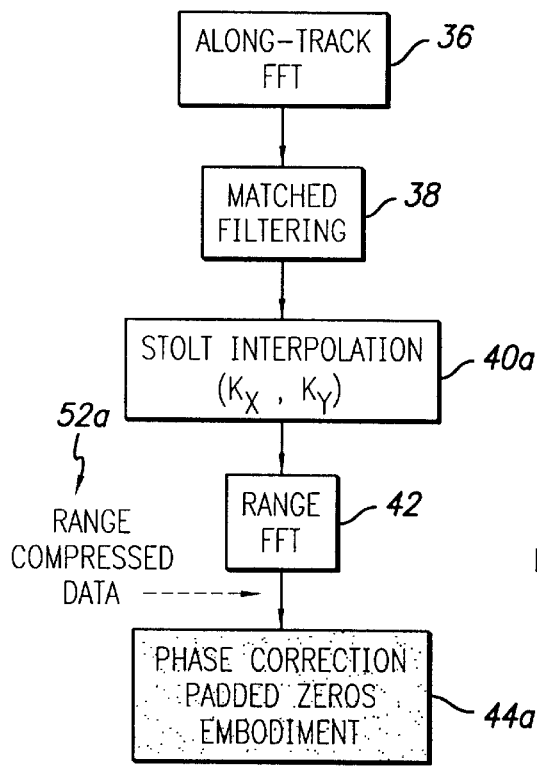
FIG. 6a is a simplified block diagram of a portion of RMA showing the inputs for a padded zero embodiment of the new phase correction scheme in accordance with the teachings of the present invention.

FIG. 6a is a simplified block diagram of a portion of RMA showing the inputs for a padded zero embodiment of the new phase correction scheme in accordance with the teachings of the present invention. In this embodiment, the Stolt Interpolation 40a is implemented as normal for RMA, using the aperture length required for the specified resolution. The range compressed data 52a generated by the following Range FFT 42 is input to the Padded Zero Phase Correction unit 44a.

Figure 6B:
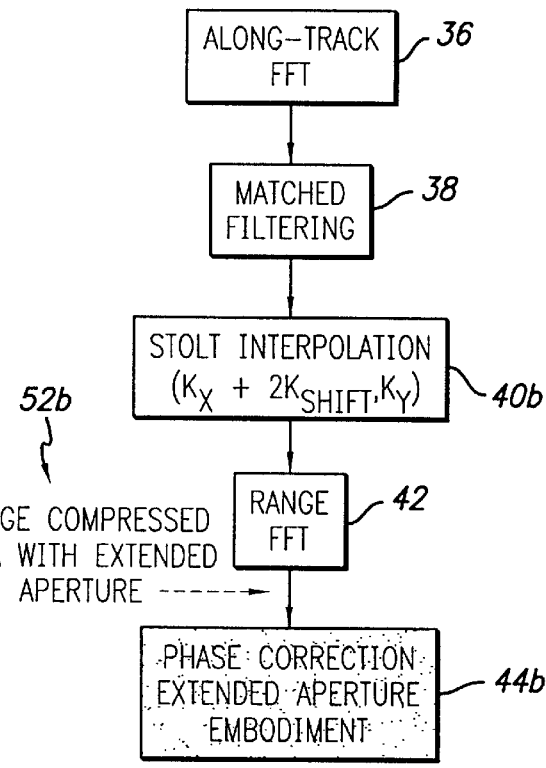
FIG. 6b is a simplified block diagram of a portion of RMA showing the inputs for an extended aperture embodiment of the new phase correction scheme in accordance with the teachings of the present invention.

FIG. 6b is a simplified block diagram of a portion of RMA showing the inputs for an extended aperture embodiment of the new phase correction scheme in accordance with the teachings of the present invention. In this embodiment, the length of the aperture generated by the Stolt interpolation 40b is greater than the length required for the specified resolution. The length of padded zeros in the first embodiment and the data extension in the second embodiment should be identical, and it is determined by the mapping range and the size of the processed image in the azimuth direction.

Because of the increase in the usable phase information, performance in estimation and correction of phase by the second embodiment is better than that of the first. The second embodiment also does not include the last two FFT functions required in the first embodiment since the signal support is not required to shift back to the initial position. Considering the computational efficiency and performance, the second method is recommended for implementation by just increasing the aperture size in the Stolt interpolation.

Figure 7:
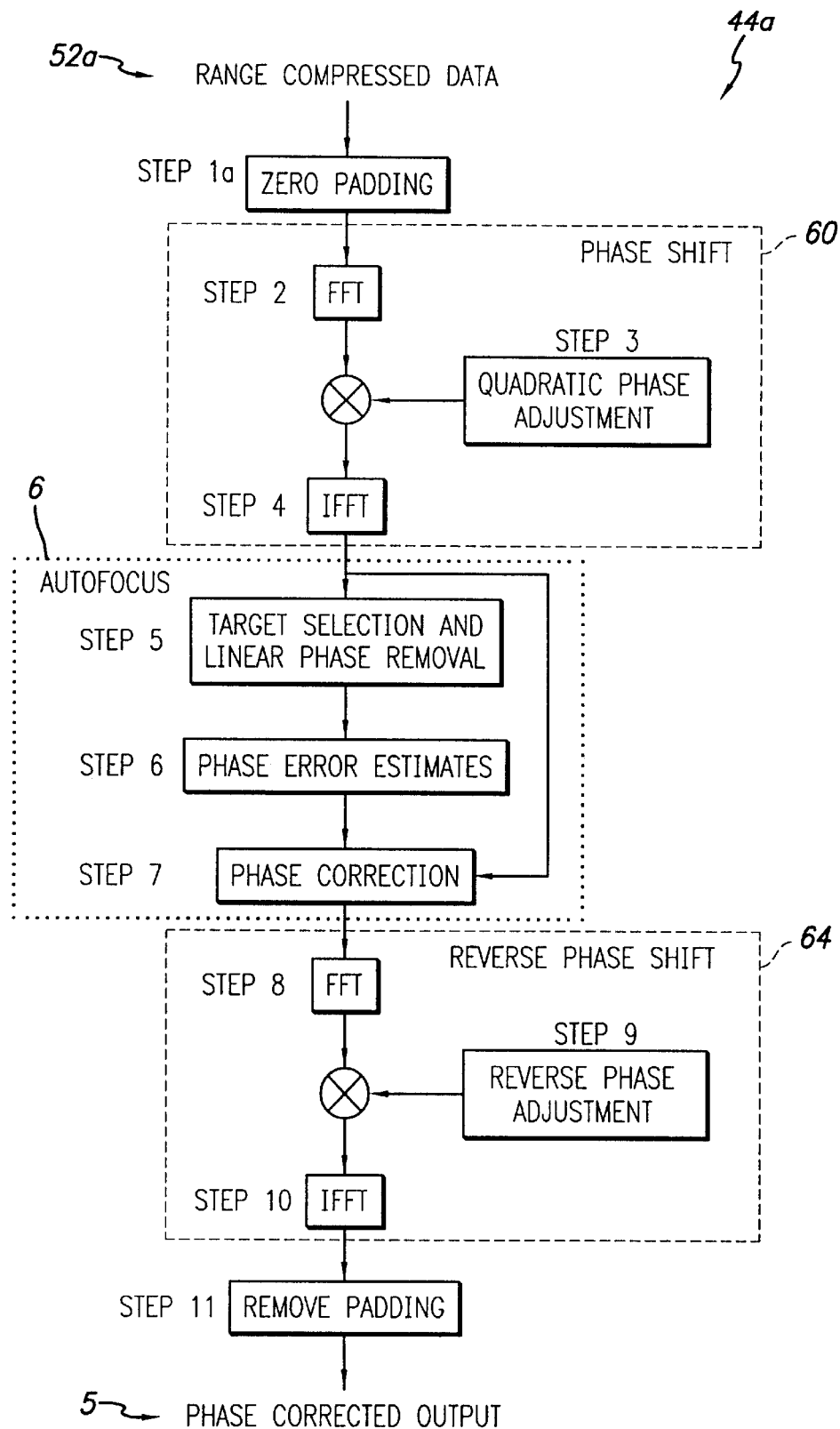
FIG. 7 is a flow diagram of a padded zero embodiment of the new phase correction scheme in accordance with the teachings of the present invention.

FIG. 7 is a flow diagram of a padded zero embodiment 44a of the new phase correction scheme in accordance with the teachings of the present invention. In this embodiment, the invention is comprised of three major parts. The first part 60, including Steps 2 through 4, is for shifting the signal support through quadratic phase adjustments in the spatial domain. The second part 62, including Steps 5 through 7, is for phase correction using autofocus algorithms. The third part 64, including Steps 8 through 10, is for shifting the signal support back to its initial position. It should be noted that all FFT functions in this figure are performed in the azimuth direction.

Figure 8A:
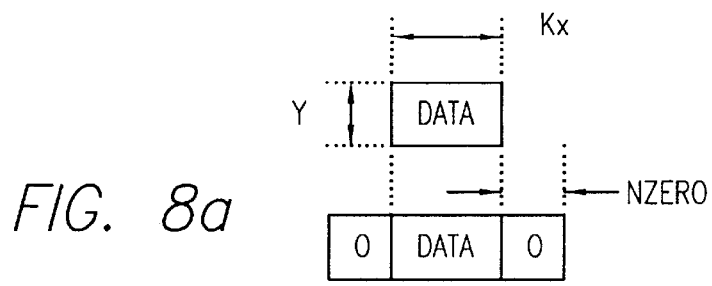
FIG. 8a is an illustration showing the input data with padded zeros.

In STEP 1a, zero padding is applied to the input range compressed data 52a. FIG. 8a is an illustration showing the input data block with padded zeros. Zero padding to the range compressed data in the azimuth direction ($K_x$) is required to avoid a wrap around effect when the FFT function is performed. Nzero, the number of padded zeros in each side of the data, is determined by the mapping range and the size of the map, $W_{az}$, in the azimuth direction:

$$Nzero = \frac{2}{\lambda} \cdot \frac{W_{az}/2}{R} \cdot \frac{1}{dkx} = \frac{1}{\lambda} \cdot \frac{W_{az}^2}{R} \quad [7]$$

In STEP 2, a forward FFT function is applied to the zero padded data. This converts the data to the spatial domain. This is the first step to accomplish shifting of the signal support in the spatial frequency. It is followed by phase correction (STEP 3) before converting back to the spatial frequency domain by the IFFT function (STEP 4).

In STEP 3, the phase is adjusted using a quadratic phase function. For the shifting of signal support by $\Delta K_x$ as expressed in Equation 5, the phase of the data after the FFT function (STEP 2) needs to be adjusted by:

$$\theta = 2\pi \cdot \Delta K_X \cdot X = -2\pi \cdot \frac{2}{R\lambda} \cdot X^2 \quad [8]$$

However, since a shift in $K_x$ should be $$\frac{1}{2\pi}\left(\frac{d\theta}{dX}\right) = \frac{2X}{R\lambda},$$

the correct phase adjustment should be:

$$\Delta\theta = \frac{\theta}{2} = -2\pi \cdot \frac{X^2}{R\lambda} \quad [9]$$

Figure 8B:
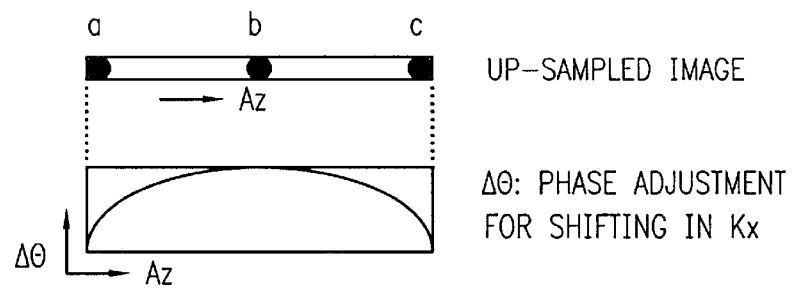
FIG. 8b is an illustration showing the phase adjustment needed to align the signal support.

FIG. 8b is an illustration showing the phase adjustment $\Delta\theta$ needed to align the signal support for different points a, b, and c in the up-sampled image data formed after the FFT in STEP 2.

The phase that needs to be applied to the pixel data at an index n from the map center can be expressed as:

$$\Delta\theta_n = -2\pi \cdot \frac{d_{pxl}^2}{R \cdot \lambda} \cdot n^2 \quad [10]$$

where $d_{pxl}$ is the pixel spacing.

In STEP 4, an inverse Fast Fourier Transform (IFFT) is applied to the phase shifted data to convert the data from the spatial domain to the spatial frequency domain, completing the target dependent shifting in $K_x$ for the alignment of common phase error history.

Figure 8C:
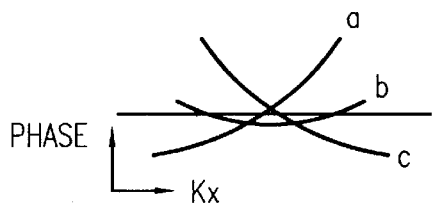
FIG. 8c is a plot of phase versus $K_x$ for three target positions prior to autofocus.
Figure 8D:
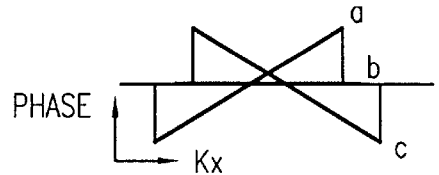
FIG. 8d is a plot of phase versus $K_x$ for three target positions after autofocus.

After the alignment of signal support through the previous steps, any efficient autofocus function can be performed to correct the now aligned common phase error for all targets. In the illustrative embodiment of FIG. 7, the application of a non-parametric method such as phase-gradient autofocus or multiple discrete autofocus algorithm is depicted. It includes STEP 5, selection of strong isolated targets and shifting to DC to remove the linear phase component; STEP 6, combining intermediate results for improved accuracy of the estimated common phase error; and STEP 7, compensating for the estimated phase error in the data formed after STEP 4. FIG. 8c is a plot of phase versus $K_x$ for the three positions a, b, and c shown in FIG. 8b prior to autofocus. FIG. 8d is a plot of phase versus $K_x$ for the three positions a, b, and c shown in FIG. 8b after autofocus. Other autofocus methods such as phase difference autofocus algorithm can also be used for the estimation and correction of phase error.

After autofocus is applied, Steps 8 through 10 shift back the shifted signal support that was performed earlier.

In STEP 8, an FFT function is applied to the phase corrected data. The output of this FFT function is an up-sampled image.

Figure 8E:
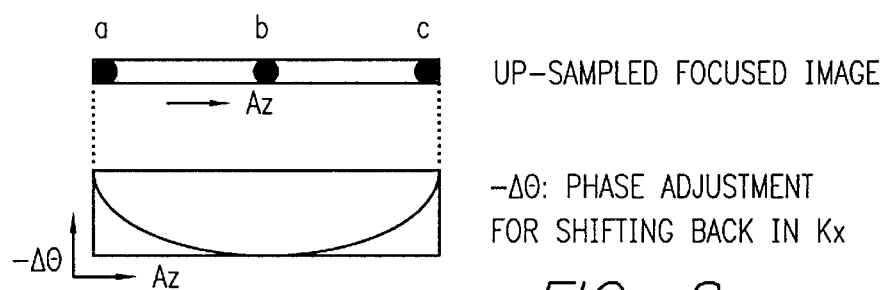
FIG. 8e is an illustration showing the phase adjustment needed to remove the previous phase shift.

In STEP 9, the inverse function of the phase adjustment performed earlier (STEP 3) is applied to shift back the signal support that is dependent on the target azimuth location. FIG. 8e is an illustration showing the phase adjustment $-\Delta\theta$ needed to remove the previous phase shift.

In STEP 10, an inverse FFT function is applied to convert the data back to the spatial frequency domain. The shifting back of the signal support is completed by this function.

Finally, in STEP 11, the extra data corresponding to the padded zeros inserted in STEP 1 are removed, and the phase corrected output 54 is then sent to the Weighting and Azimuth FFT function 46 to generate a final focused image.

Figure 9:
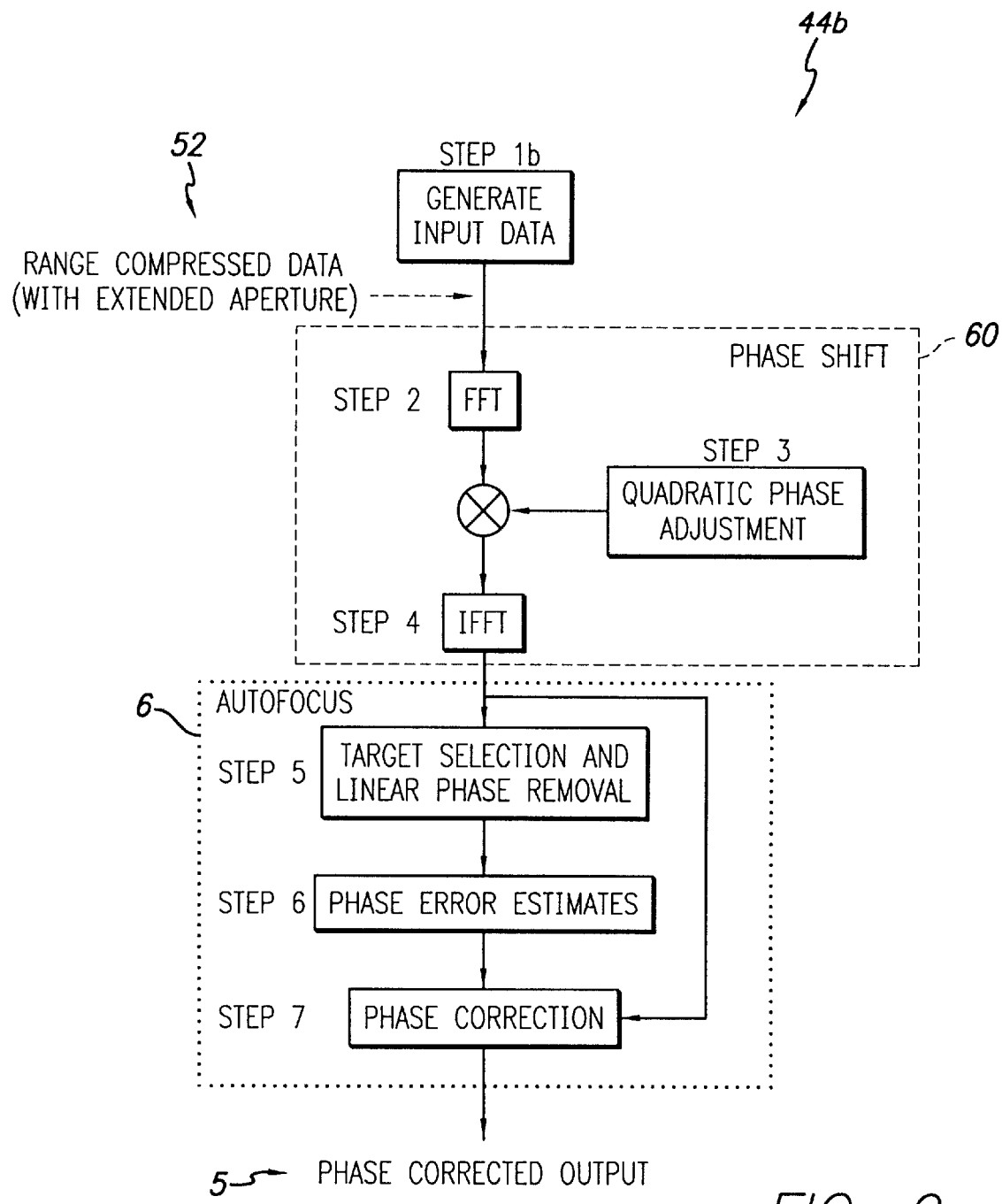
FIG. 9 is a flow diagram of an extended aperture embodiment of the new phase correction scheme in accordance with the teachings of the present invention.

FIG. 9 is a flow diagram of an extended aperture embodiment of the new phase correction scheme in accordance with the teachings of the present invention. This embodiment is based on the fact that the last four steps in the first embodiment can be eliminated if data corresponding to the padded zeros is available. Therefore, the aperture in $K_x$ for this method is longer than that of the first embodiment by the number of the padded zeros. With the extended output aperture from the Stolt interpolation, this method has less processing steps and provides better performance than the first method.

This embodiment is comprised of two main parts, identical to the first two parts of the padded zero embodiment. The first part 60, including Steps 2 through 4 in FIG. 9, is for the shifting of signal support through quadratic phase adjustments in the spatial frequency domain. The second part 62, including Steps 5 through 7, is for phase correction using autofocus algorithms.

In STEP 1b, input data with an extended aperture is generated (by the Stolt interpolation 40b). This embodiment takes as input the range compressed data 52b after the Range FFT function 42. It is important to note that the length of the aperture in $K_x$ should be extended as much as the maximum shifting that occurs with the image edges. $K_x$ the required aperture length for the resolution $\delta_{az}$ with the broadening factor $k_a$ is:

$$K_X = k_a / \delta_{az} \qquad [11]$$

Maximum shifting $K_{shift}$ is equal to Nzero in the padded zero embodiment. Therefore, the required aperture length is:

$$(k_a/\delta_{az}) + 2 \cdot Nzero \qquad [12]$$

Steps 2 through 7 are identical to those in the padded zero embodiment. The output of the autofocus function 62 is the phase corrected output 54 which is then sent to the Weighting and Azimuth FFT function 46 to generate a final focused image.

The phase that was applied in the phase adjustment function was given as a function of $n^2$, where n is the azimuth pixel index. This was obtained from the approximated expression in Equation 4. Approximation is valid when the variation of Doppler cone angle for all targets in an image is small, which is true in most SAR systems. When the variation of Doppler cone angle is not small enough, a more accurate expression derived as follows can be used for the required phase adjustment.

Since $\Phi_1 = \Phi_0 - X/R$ in FIG. 3, phase due to shifting of $\Delta K_{X,AT}$ can be expressed as:

$$\Delta\theta = 2\pi \cdot A \cdot \Delta K_{X,AT} \cdot X / \sin \Phi_0 \qquad [13]$$

$$= -2\pi \cdot A \cdot \frac{2}{\lambda \cdot \sin\varphi_0} (\cos(\varphi_0 - X/R) - \cos\varphi_0) \cdot X \qquad [14]$$

Here A is the variable that needs to be determined to provide exact shifting $\Delta K_X$.

By taking the derivative of $\theta$ in X for $\Delta K_{X,AT}$, that is, $$\Delta K_{X,AT} = \frac{1}{2\pi} \frac{d\theta}{dX},$$

A is determined to be:

$$A = \frac{\cos(\varphi_0 - X/R) - \cos\varphi_0}{(\cos(\varphi_0 - X/R) - \cos\varphi_0 + X/R \cdot \sin(\varphi_0 - X/R))} \qquad [15]$$

$$= \frac{1}{1 + \frac{X}{R} \cdot \frac{\sin(\varphi_0 - X/R)}{2\sin(\varphi_0 - X/2R)\sin(X/2R)}}$$

This expression for A needs to be inserted into Equation 14 for the calculation of $\Delta\theta$. For X<<R, A becomes 0.5, and Equation 14 is approximated to Equation 6.

Figure 10A:
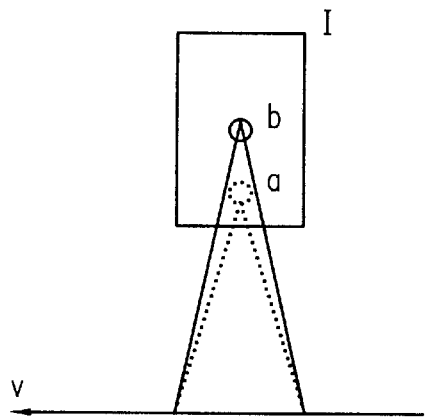
FIG. 10*a* is an illustration showing two targets at different range locations in the spatial domain.
Figure 10B:
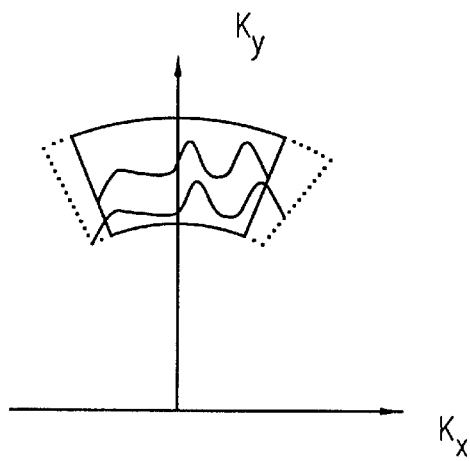
FIG. 10*b* is an illustration showing the corresponding signal support areas in the spatial frequency domain of the two targets in FIG. 10*a*.

Signal support span is determined by the SAR angle. As illustrated in FIG. 10, signal support for a target at the near range is greater than that at the longer range. FIG. 10a is an illustration showing two targets, a and b, at different range locations in the spatial domain. FIG. 10b is an illustration showing the corresponding signal support areas, A and B, in the spatial frequency domain of the two targets, a and b, in FIG. 10a. As shown in this figure, common phase error can be stretched or expanded depending on the range to the targets. Since the target position variation in the azimuth direction is generally very small compared with the mapping range in most SAR applications, the effect of expanding or stretching is negligible. When the map size gets big enough compared with the mapping range, phase error estimation and correction can be done separately for each range block as shown in FIG. 11.

Figure 11:
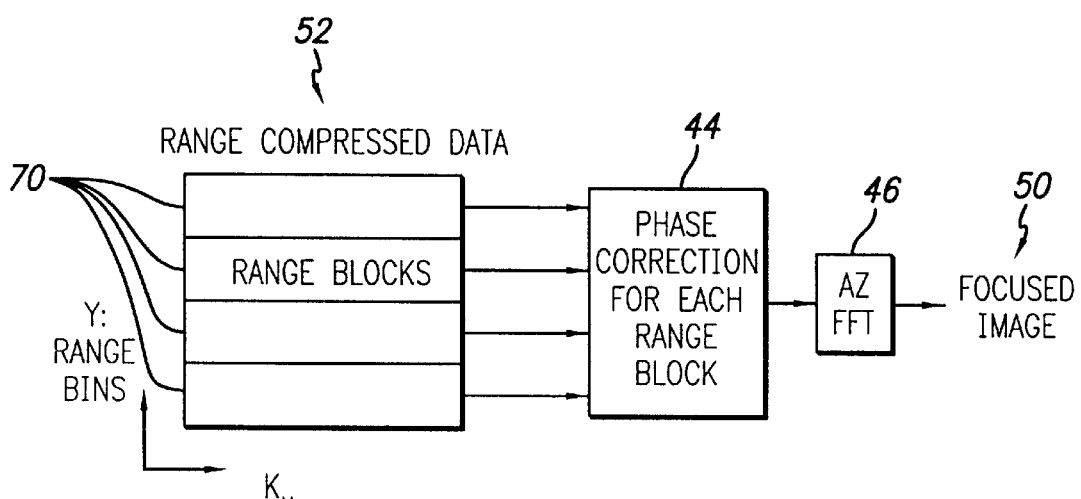
FIG. 11 is a block diagram showing an alternative embodiment of the present invention where the input data is partitioned into range bins.

FIG. 11 is a block diagram showing an alternative embodiment of the present invention where the input data is partitioned into range bins. The range compressed data 52 is partitioned into different range bins 70. Phase correction 44 (shifting and focusing as described above) is then performed on each range block separately. The combined output data is then sent to the Azimuth FFT 46 to produce a final focused image 50.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for phase correction in synthetic aperture-radar (SAR) systems with multiple targets having corresponding signal support areas comprising:
   first means for aligning said signal support areas from all targets through phase adjustments in the spatial domain, wherein said first means includes
   third means for converting range compressed input data to the spatial domain,
   fourth means for shifting the phase of the resulting spatial domain data, and
   fifth means for converting said spatial domain data back to the spatial frequency domain; and
   second means for correcting common phase error after said signal support areas have been aligned.

2. The invention of claim 1 wherein said third means includes a Fast Fourier Transform (FFT).

3. The invention of claim 1 wherein said fourth means includes a quadratic phase function.

4. The invention of claim 1 wherein said phase shift is given by $$\Delta\theta_n = -2\pi \cdot \frac{d_{pxl}^2}{R \cdot \lambda} \cdot n^2,$$

where $\lambda$ is the wavelength of the transmitted radar signal, R is the distance from the radar platform to the image center, $d_{pxl}$ is the pixel spacing, and n is the pixel index from the map center.

5. The invention of claim 1 wherein said fifth means includes an inverse Fast Fourier Transform (IFFT).

6. The invention of claim 1 wherein said second means includes an autofocus function.

7. The invention of claim 2 wherein said system further includes sixty means for avoiding a wrap around effect introduced by the FFT.

8. The invention of claim 7 wherein said sixth means includes generating extended aperture input data.

9. The invention of claim 7 wherein said sixth means includes zero padding of the input data.

10. The invention of claim 9 wherein said system further includes seventh means for shifting said signal support areas back to their initial positions after phase error has been corrected.

11. The invention of claim 10 wherein said seventh means includes:
   eighth means for converting phase corrected data to the spatial domain;
   ninth means for shifting the phase of the resulting spatial domain data; and
   tenth means for converting said spatial domain data back to the spatial frequency domain.

12. The invention of claim 10 wherein said system further includes means for removing said zero padding after said signal support areas are shifted back to their initial positions.

13. A range migration algorithm for synthetic aperture radar systems comprising:
   a motion compensation function;
   a range deskew function;
   an along-track FFT function;
   a matched filter;
   a Stolt interpolation function;
   a range FFT function;
   a phase correction system comprised of:
      a first function for aligning said signal support areas from all targets through phase adjustments in the spatial domain, and
      a second function for correcting common phase error after said signal support areas have been aligned; and
   a data weighting and azimuth FFT function.

* * * * *